United States Patent

Menzel

[11] 3,892,137
[45] July 1, 1975

[54] TRANSFER BAR DRIVE MECHANISM

[75] Inventor: Klaus Menzel, Orchard Lake, Mich.

[73] Assignee: The Bendix Corporation, Southfield, Mich.

[22] Filed: July 9, 1973

[21] Appl. No.: 377,360

[52] U.S. Cl. .................. 74/99 R; 74/103; 198/221
[51] Int. Cl. ............................................. F16h 21/44
[58] Field of Search .......... 198/218, 221, 111, 112, 198/124, 125; 74/26, 27, 45, 89, 22 A, 25, 96, 99 R, 102, 103, 107

[56] References Cited
UNITED STATES PATENTS

| | | | |
|---|---|---|---|
| 1,560,070 | 11/1925 | McNamara | 74/45 |
| 3,361,250 | 1/1968 | Pierce et al. | 198/221 |
| 3,367,603 | 2/1968 | Feyerherd | 74/96 |

*Primary Examiner*—Evon C. Blunk
*Assistant Examiner*—Joseph E. Valenza
*Attorney, Agent, or Firm*—John R. Benefiel

[57] ABSTRACT

A mechanical transfer bar drive mechanism is disclosed including a rotary crank arm oscillating a transfer arm drivingly connected to the transfer bar, this oscillation being carried out by means of drive surfaces carried by the crank arm and transfer arm which are in engagement when the transfer arm is in positions between the extreme end positions of its oscillating motion but leaving engagement as the transfer arm reaches each end position so that precision control of the drive means rotating the crank arm is not utilized to position the transfer arm in its extreme positions. This end positioning is carried out with a limit stop arrangement and cooperating cams carried by the crank arm and transfer arm which come into proper relative position with respect to the transfer arm as it moves into each end position.

14 Claims, 10 Drawing Figures

3,892,137

TRANSFER BAR DRIVE MECHANISM

BACKGROUND OF THE INVENTION

1. Field of the Invention

This invention concerns transfer bar drive mechanisms.

2. Description of the Prior Art

In automated machining and/or assembly of workpieces in synchronous transfer machines, it has been the practice in the past to advance the workpieces (or pallets supporting the workpieces) successively through a series of workstations wherein the various operations occur. As each workpiece comes into position in the station it is mechanically located (usually by means of locating pins) and clamped prior to initiation of the operation to be performed.

In the past, this transfer has been accomplished by means of a reciprocating transfer bar with dogs oscillating into engagement with the pallets or workpieces prior to advancing movement, the transfer bar reciprocation causing successive advance of the pallets. This engagement of the dogs with the pallets has been by means of either complementary recesses formed in the pallets or by protuberances trapped between a pair of dogs, a slight clearance space between the dogs and recesses (or protuberances) being provided when the dogs are in engagement to allow some lost motion between the pallet and transfer bar during the locating operation, as will be described in further detail herein.

The positioning of the workpieces by the transfer bar in the stations, while not relied on for accurate positioning in order to carry out the operations to be performed in the station, must leave the workpiece in reasonably accurate position to prevent jams from occurring when the workpiece is located in the station.

These jams can occur due to the practice of providing "overlap" in the operation of the transfer bar and the locating mechanism. That is, it has been the practice to carry out the locating of the workpiece in the station prior to any disengagement of the transfer bar dogs with the recesses formed in the pallet so that in the event of malfunction or shutdowns, all of the workpieces will be secured regardless of what position of the cycle the shutdown occurs so as to prevent inadvertent misalignment of the workpieces. If the transfer mechanism does not position the workpiece or pallet accurately, the locating element (commonly a chamfered pin) may attempt to move the workpiece beyond the lost motion provided by the clearance space between the dogs and the recesses, causing the locating mechanism to "fight" the transfer bar drive mechanism, potentially causing considerable damage to the machine.

Likewise, after the dogs are rotated out of the recesses and the bar is retracted, the position of the transfer bar must be controlled fairly accurately in the retracted position before it is again rotated to again pass into the recesses since this operation is carried out while the pallets are still being held by the locating pins and cannot be moved by the dogs as they seat.

In the past, the transfer bar drive has been provided satisfactorily by hydraulic cylinders, but trends in the industry have created a need for a mechanical transfer bar drive, in which the accurate positioning of the pallet by the transfer bar has been difficult and expensive to achieve. An example of a typical approach to this problem is found in U.S. Pat. No. 3,361,250. In this approach, the motion of the transfer bar is controlled by precisely controlling the electric motor which drives the drive mechanism by means of limit switches and a complex control system.

Since it would be impractical to accurately stop the motor when it is operating at the speed required for transferring, the use of a costly two speed motor is necessitated, which is switched into a low speed winding as the end of the cycle is approached. It can be appreciated that this approach results in a machine which is difficult to set up, is expensive, unreliable, and would involve a good deal of maintenance.

Furthermore, these drives have imparted a harmonic type motion to the pallet, involving a greatly slowed motion at the end of each cycle to minimize the potentially tremendous inertial forces created by a constant acceleration mechanism, particularly for heavy workpieces and at the high production rates commonly required. This harmonic type motion aggravates the jam problem outlined above, since the mechanical advantage of the transfer mechanism at the end of the cycle available to resist movement by the locating mechanism is tremendous, and a jam could cause the pallets to be lifted off the line rather than causing reverse movement against the transfer drive.

Therefore, it is an object of the present invention to provide a simple, accurate, mechanical transfer bar drive mechanism which does not involve precision control of the drive motor.

SUMMARY OF THE INVENTION

These and other objects which will become apparent upon a reading of the following specification and claims is accomplished by a mechanical transfer bar mechanism including a rotary crank arm oscillating a transfer arm drivingly connected to the transfer bar, this oscillation being carried out by means of drive surfaces carried by the crank arm and transfer arm which are in engagement when the transfer arm is in positions between the extreme end positions of its oscillating motion but leaving engagement as the transfer arm reaches each end position so that precision control of the drive means rotating the crank arm is not utilized to position the transfer arm in its extreme positions. This end positioning is carried out with a limit stop arrangement and cooperating cams carried by the crank arm and transfer arm which come into proper relative position with respect to the transfer arm as it moves into each end position.

DETAILED DESCRIPTION

Figure 1:
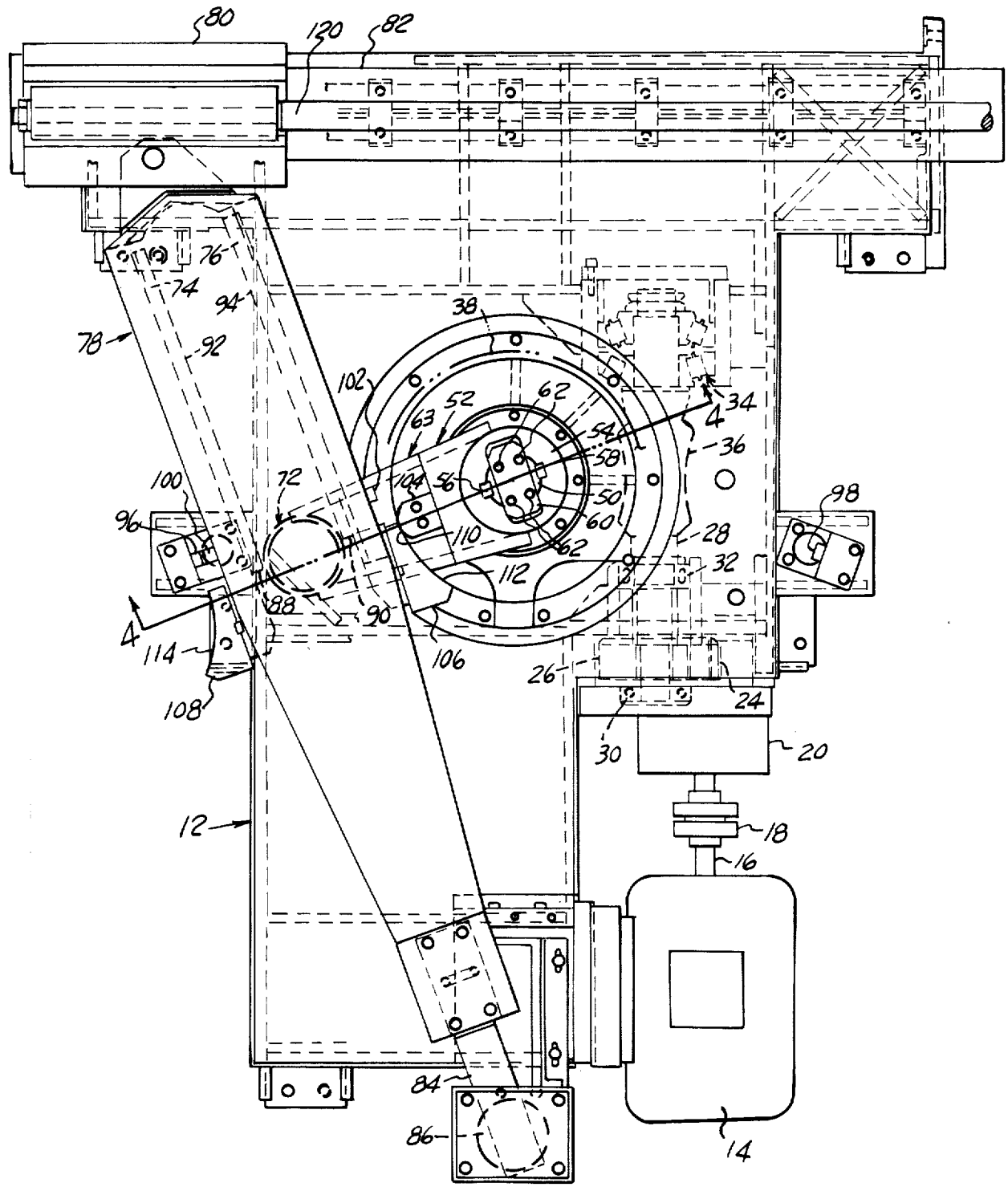
FIG. 1 is a plan view of a transfer bar drive mechanism according to the present invention.
Figure 2:
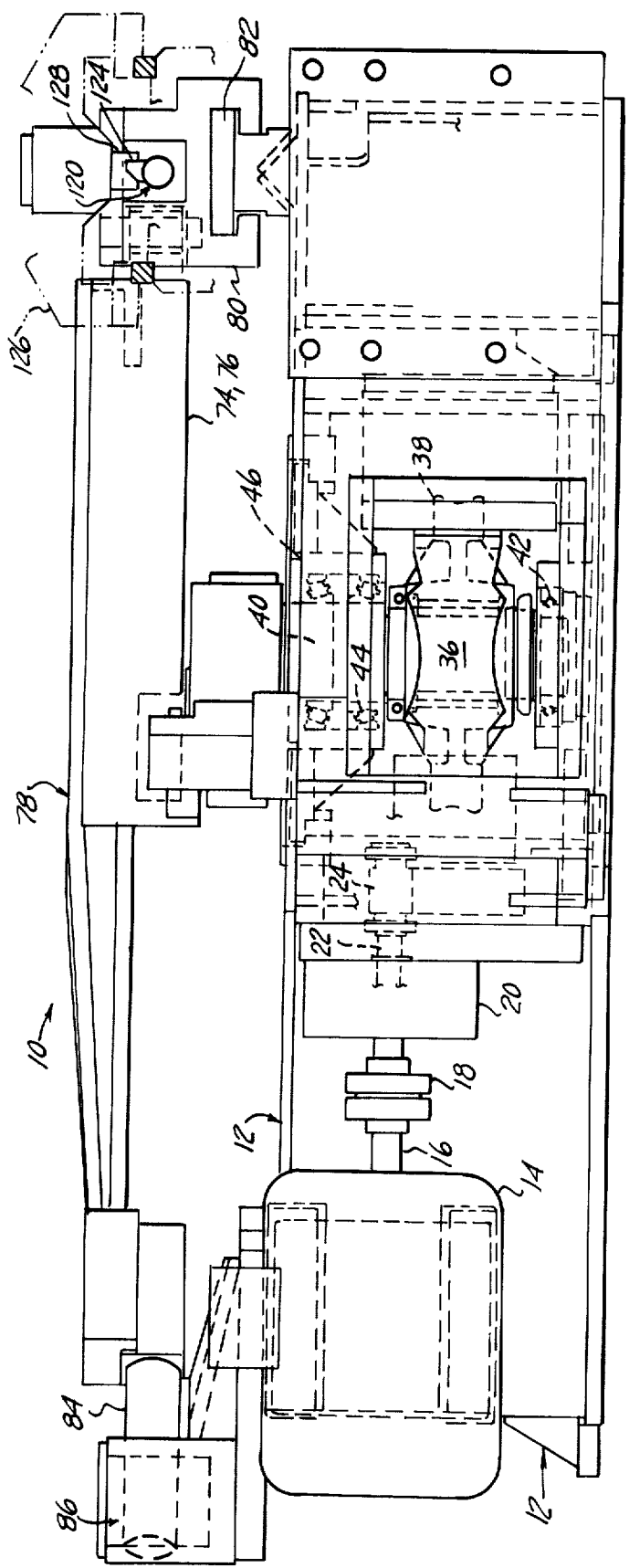
FIG. 2 is a front elevational view of the drive mechanism shown in FIG. 1.
Figure 3:
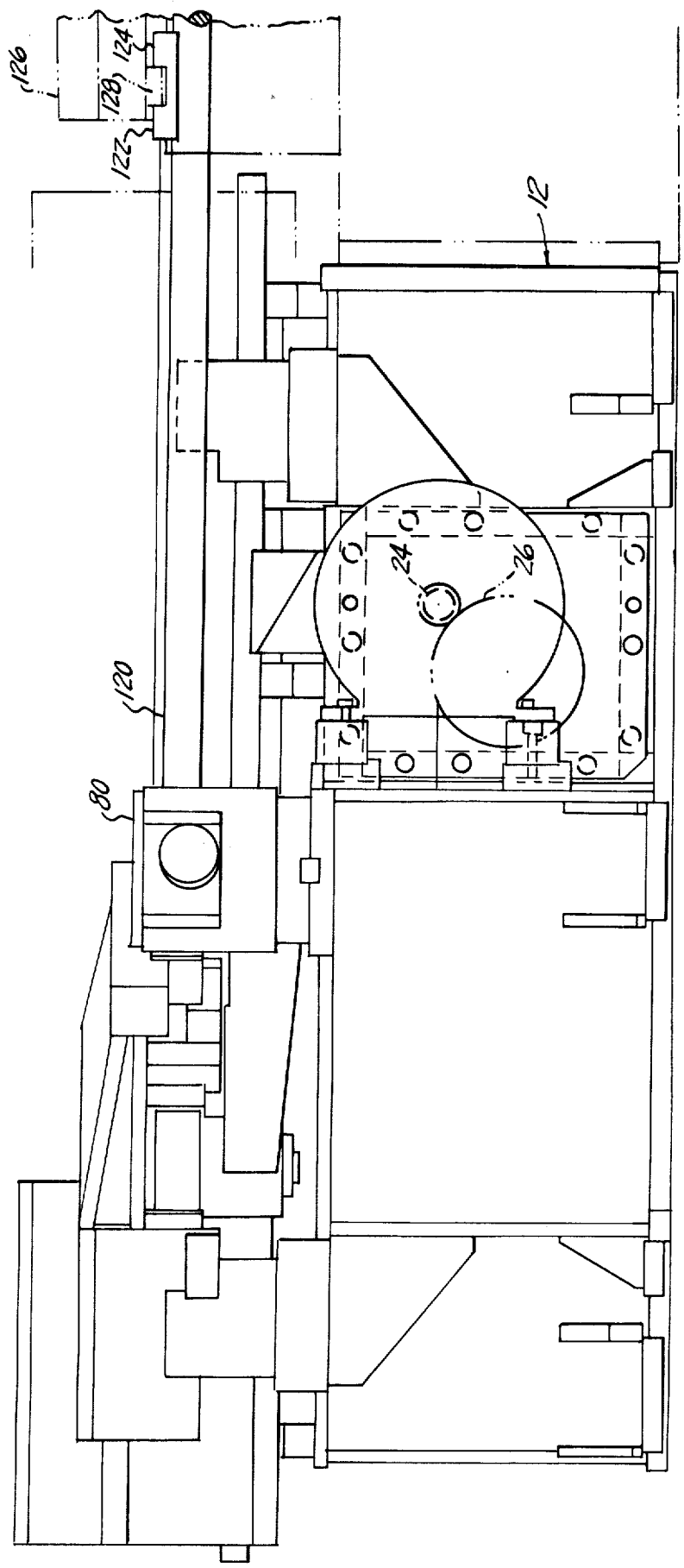
FIG. 3 is a partial side elevational view of the drive mechanism shown in FIGS. 1 and 2.

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Referring to the drawings, the transfer bar drive mechanism 10 includes a main frame 12 supporting an electric drive motor 14, the output shaft 16 of which drives, via coupling 18, a magnetic brake unit 20. Fixed to the output shaft 22 of the magnetic brake unit 20 is a pinion gear 24 drivingly engaged with a spur gear 26 fixed to a shaft 28 supported to the main frame 12 by bearing 30, 32, 34.

Figure 4:
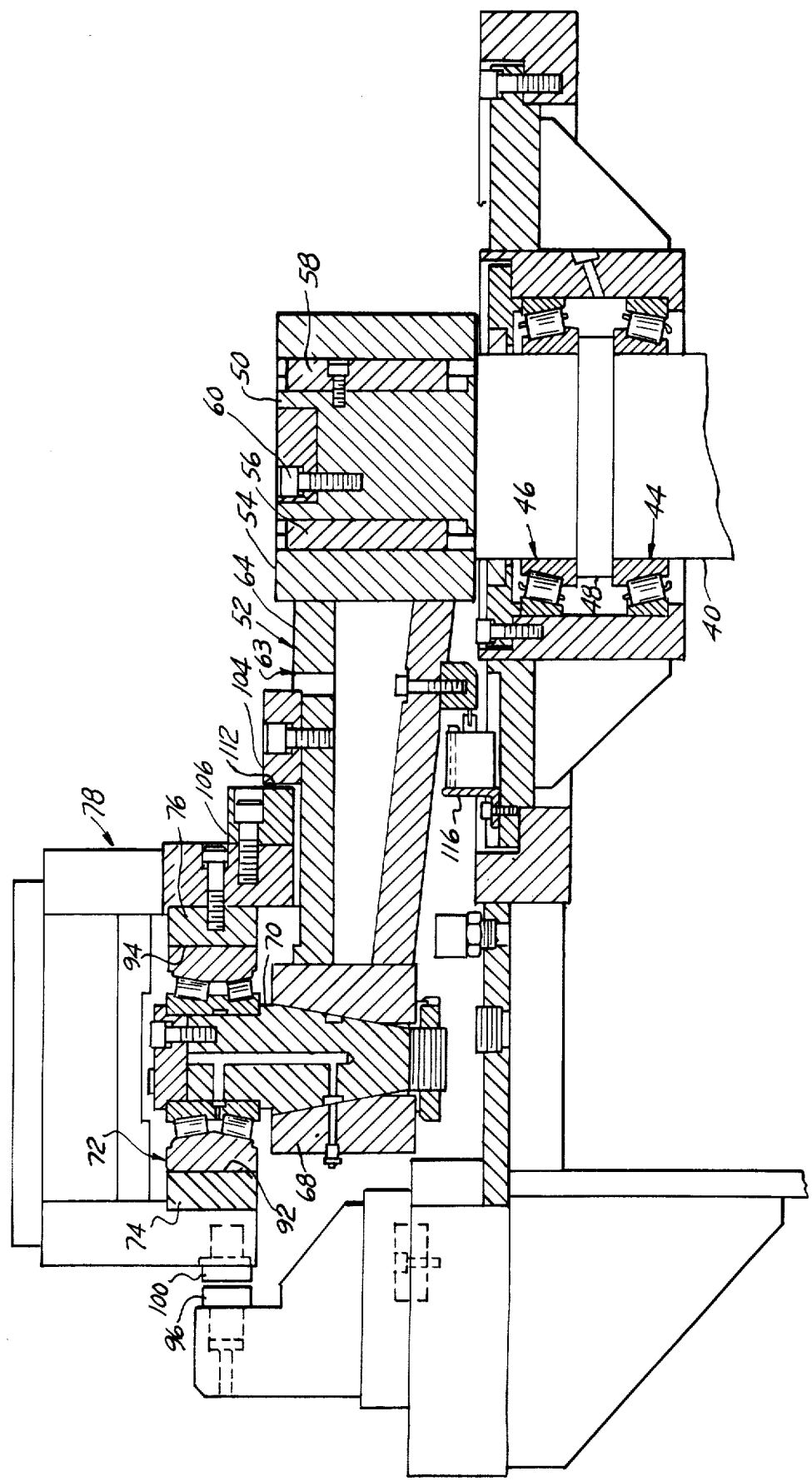
FIG. 4 is a view of the section taken along the line 4—4 in FIG. 1.

Integral with shaft 28 is a worm gear 36 positioned to drive a worm wheel 38 in turn fastened to an axle shaft 40 supported in bearings 42, 44, 46, thrust loads being absorbed by shoulder 48 (FIG. 4) and bearings 44 and 46.

Axle shaft 40 has formed thereon a reduced diameter end portion 50 to which is connected a crank arm 52 so as to be rotated with rotation of axle shaft 40. This connection is obtained by means of an inner hub 54 fit over end portion 50 and keyed thereto by means of keys 56, 58 and end plate 60, which also serves to retain the hub 54 axially by virtue of being secured to the end portion 50 with cap screws 62.

Crank arm 52 includes a connector bracket 63 in turn including plates 64 and 66 welded to the inner hub 54 at one end and to an outer hub 68 at the other end.

Secured in outer hub 68 is a stub shaft 70, supporting a roller bearing 72 on its outer end.

Roller bearing 72 is positioned between a pair of rails 74 and 76 fixed to a transfer arm 78 so as to cause oscillation of the transfer arm 78 upon rotation of the crank arm 52.

Transfer arm 78 is pinned at one end to a slider block 80 supported for linear motion along a rail 82. The opposite end of the transfer arm 78 is fixed to a post 84 slidably retained in a rotatable bushing 86 to accommodate swinging motion of the transfer arm 78.

As seen in FIG. 1, the rails 74 and 76 have their ends 88 and 90 positioned such that the roller bearing 72 passes out of engagement with the inner rail surfaces 92, 94 upon continued counter-clockwise oscillation of the crank arm 52 from the extreme left hand position of the transfer arm 78 shown in FIG. 1, or upon continued clockwise motion of the crank arm 52 from the extreme right hand position of the transfer arm 78.

A pair of fixed stops 96 and 98 secured to the main frame 12 are provided to accurately limit the extent of outward movement of the transfer arm 78 in either direction by cooperating with a pair of stop surfaces 100 and 102 provided on the transfer arm 78.

As the crank arm 52 rotated out of engagement with the rail surfaces 92 and 94, a cam element 104 fixed to the crank arm 52 rotated into engagement with either of a pair of cam stops 106 or 108 depending on whether the arm is moving towards the right or left hand extreme positions. The cam element outer surface 110 and the surfaces 112 and 114 of cam stops are radiused so that any forces exerted by the arm by means of cam stops 106 or 108 is directed through the fixed center of the crank arm by forming them concentric to this center when the transfer arm 78 is in either extreme position so to thus provide a positive restraint of the arm in either extreme position against any movement away from the respective positive stops 96 or 98.

A small clearance is provided by grinding the stops 96 and 98 at assembly to allow a slight movement of the transfer arm during seating of the locator pins in the pallets. This clearance also allows for some misalignment of the roller bearing 72 with the rail surfaces 92 and 94 without causing a jam situation.

Figure 5:
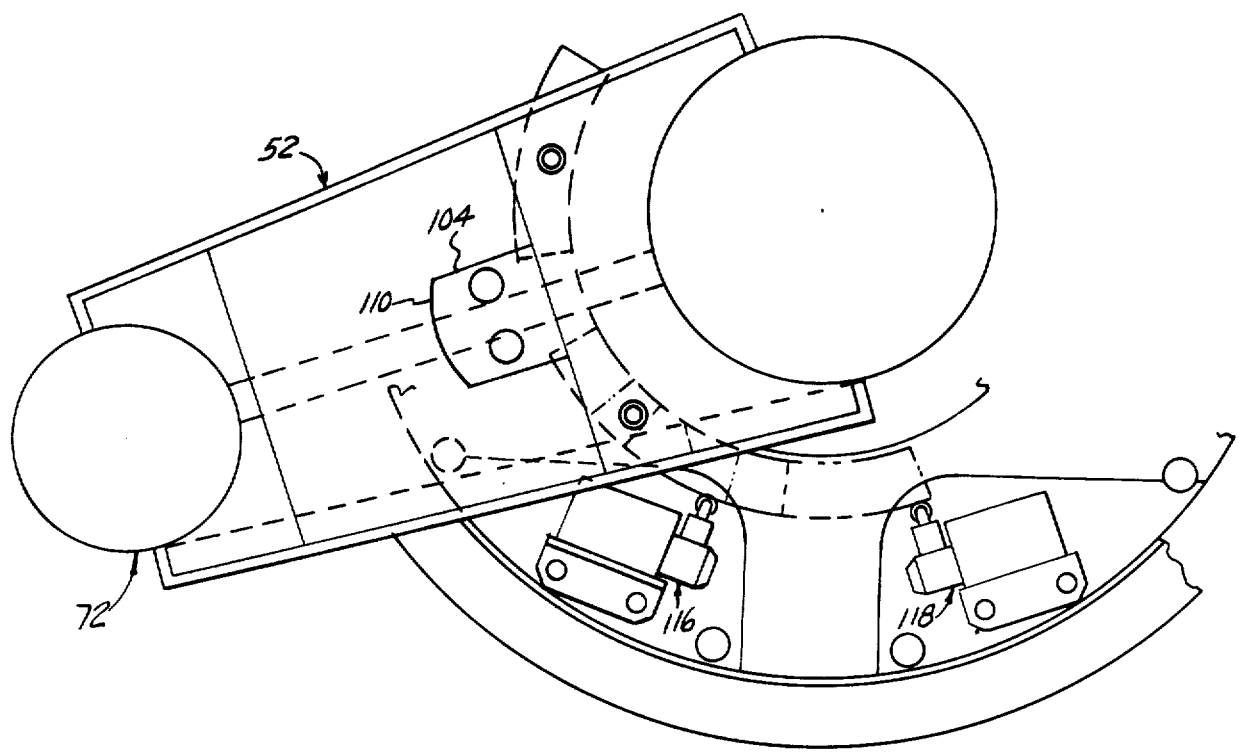
FIG. 5 is an enlarged detailed view of a portion of the drive mechanism as shown in FIG. 1.

After the crank arm 52 moves out of engagement with the rail surfaces 92 and 94, the motor 14 is deenergized at the same time the magnetic brake 20 is energized by means of a pair of limit switches 116 and 118 (FIG. 5) one of which is adapted to be tripped shortly (3° crank arm rotation) after the transfer arm 78 has moved into one or the other of the extreme positions, after which the crank arm 52 is braked to a stop. As noted in phantom in FIG. 5 continued rotation of the crank arm 52 past this point due to switch malfunction leads to tripping of the other limit switch which can be utilized as a safety feature to guard against switch failure.

The transfer bar 120 is secured for linear movement with the slider block 80 as it is advanced and retracted by the transfer arm 78. Attached to the transfer bar are a series of sets of dogs or fingers 122 and 124 a set being provided for each pallet provided in the particular transfer line. These dogs are brought into engagement with the pallets 126 (shown in phantom lines) during advancing movement of the transfer bar 120 by virture of the rotation of the transfer bar 120 such that the dogs 122 and 124 trap a protuberance 128.

Conversely, during retraction of the transfer bar 120, the dogs 122 and 124 are brought out of engagement with the pallet 126 by a reverse rotation of the transfer bar 120.

As described above, the present invention finds special application in the context of a transfer machine having a locating mechanism separate from the locating function carried out by the transfer bar 120 and which is overlapped in its operation with the transfer mechanism. As such devices are very well known and understood in the transfer machine art, however, as exemplified by the mechanisms shown in U.S. Pat. Nos. 2,672,675, 2,193,840, 2,120,966 and do not of themselves comprise the present invention, a showing in the drawings of such a mechanism is not here included.

Suffice it to say, that after the pallet 126 is brought into a station, a locating mechanism actuated by the machine control system causes a locator such as a tapered pin to be engaged with a locating surface, such as a bore formed in the pallet 126 to locate the pallet 126.

Commonly, after such location of the pallet, as can be seen from a reading of the above cited patents a clamping mechanism secures the pallets or workpieces prior to a machining operation.

Such locating is carried out prior to rotation of the transfer bar 120 to disengage the dogs 122 and 124 with the protuberances 128 formed on each pallet 126.

Figure 6:
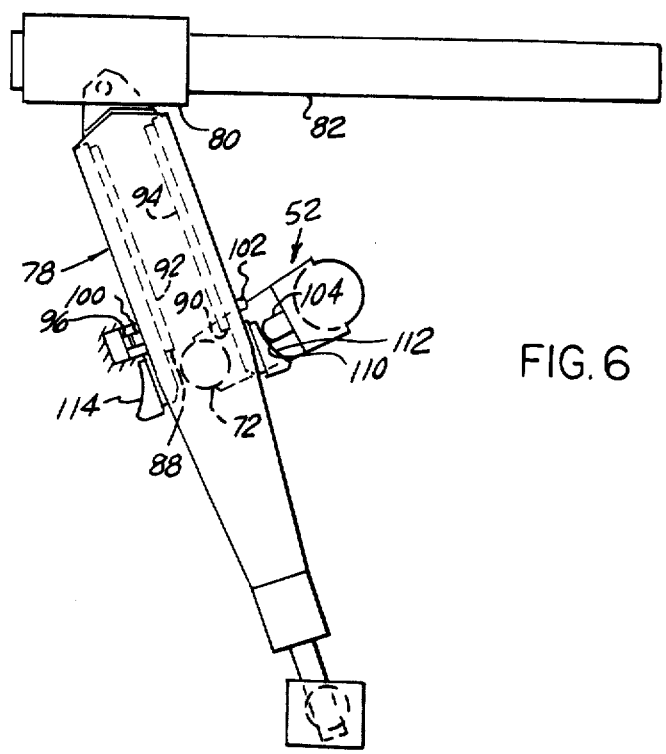
FIGS. 6–10 are diagrammatic representations of the main elements of the transfer drive mechanism of the present invention shown in various operative positions in the transfer cycle.

The operation of this drive mechanism is most easily understood by reference to FIGS. 6–10. FIG. 6 depicts the position of both the transfer arm 78 and the crank arm 52 in their extreme retracted positions. It can be seen that the roller bearing 72 has passed well out of engagement with the rail surfaces 92 and 94, while the transfer arm 78 is secured against angular movement by engagement of limit stops 96 and 100 and cam surfaces 110 and 112.

Figure 7:
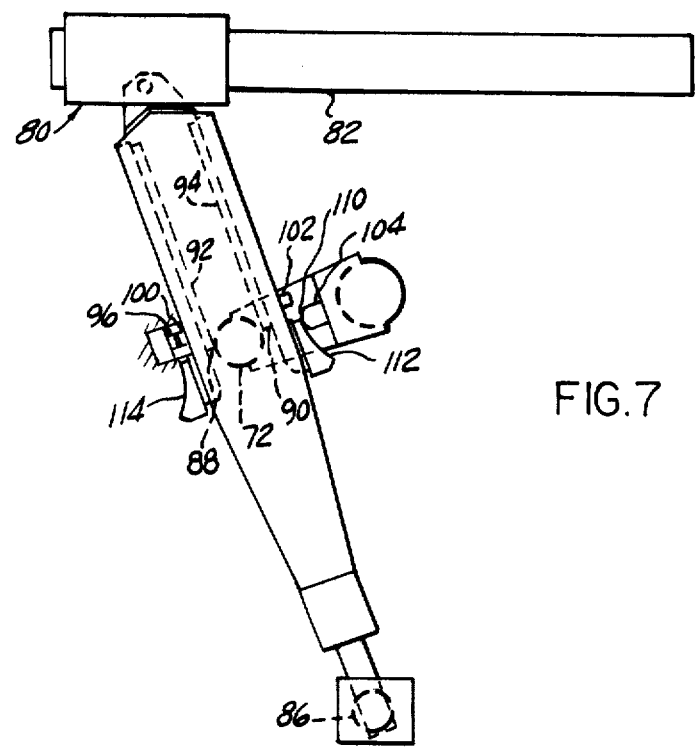

On start-up, assuming the transfer bar 120 has been rotated to bring the dogs 122 and 124 into engagement with the protuberances 128 on the pallets 126 and the locating and clamping mechanism has released the pallets 126, crank arm 52 is rotated by the rotary drive means previously described to the position shown in FIG. 7 whereat the roller bearing 72 is just engaging the rail surfaces 92 and 94 at the end positions 88 and 90. Up to this point no movement of the transfer arm 78 results from the crank arm 52 rotation since the roller 72 is out of engagement with the rail surfaces 92 and 94 and the only other engagement therebetween the cam surfaces 110 and 104 does not result in any movement of the transfer arm 78 since the cam surface 104 is formed to be concentric to the crank arm 52 rotation when the transfer arm 78 is in its extreme position.

Continued rotation of crank arm 52 causes the transfer arm 78 to rotate about the bearing 86 by virtue of the engagement of the roller bearing 72 with the rail surface 94, this rotation being "harmonic" as will be recognized by those skilled in the art. That is, a relatively slight motion of the transfer arm 78 occurs for a given amount of crank arm 52 rotation in positions relatively close to that shown in FIG. 7, while the mechanical advantage available to the crank arm 52 in accelerating the transfer arm 78 (and the pallet and workpiece) is relatively large.

Figure 8:
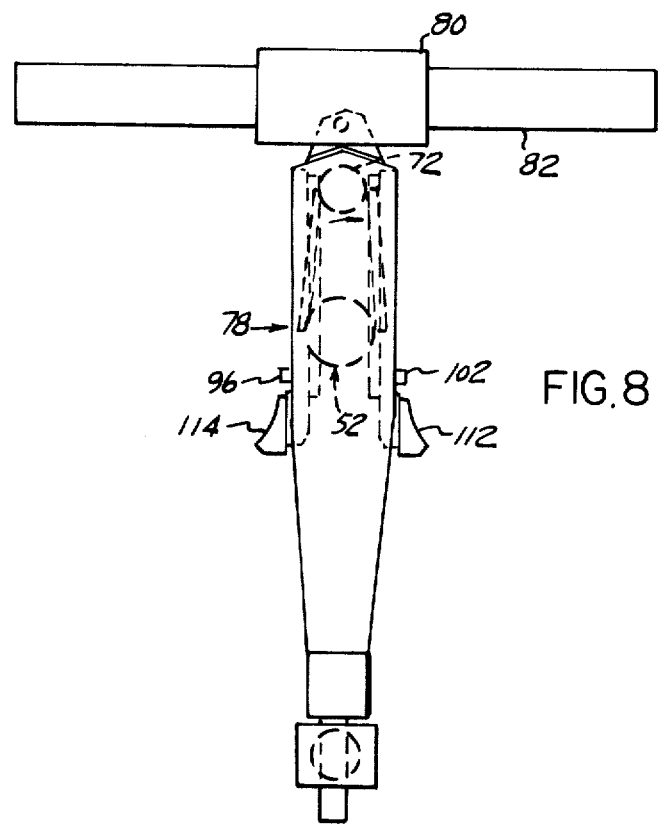

As the crank arm 52 rotates to the position shown in FIG. 8, the corresponding movement of the transfer arm 78 becomes larger and larger until the "dead center" position shown in FIG. 8 is reached at which the linear velocity of the roller bearing 72 and the slider block 80 are equal.

Figure 9:
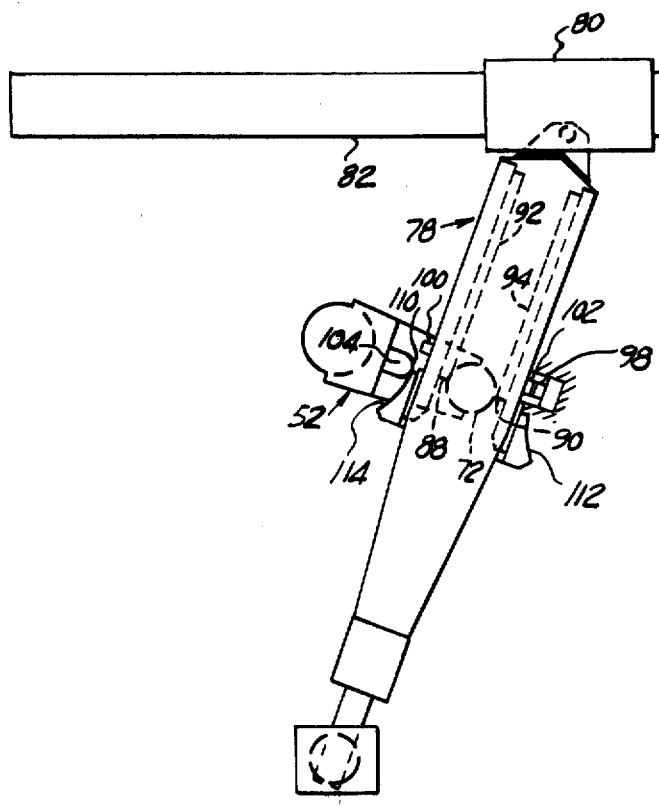
Figure 10:
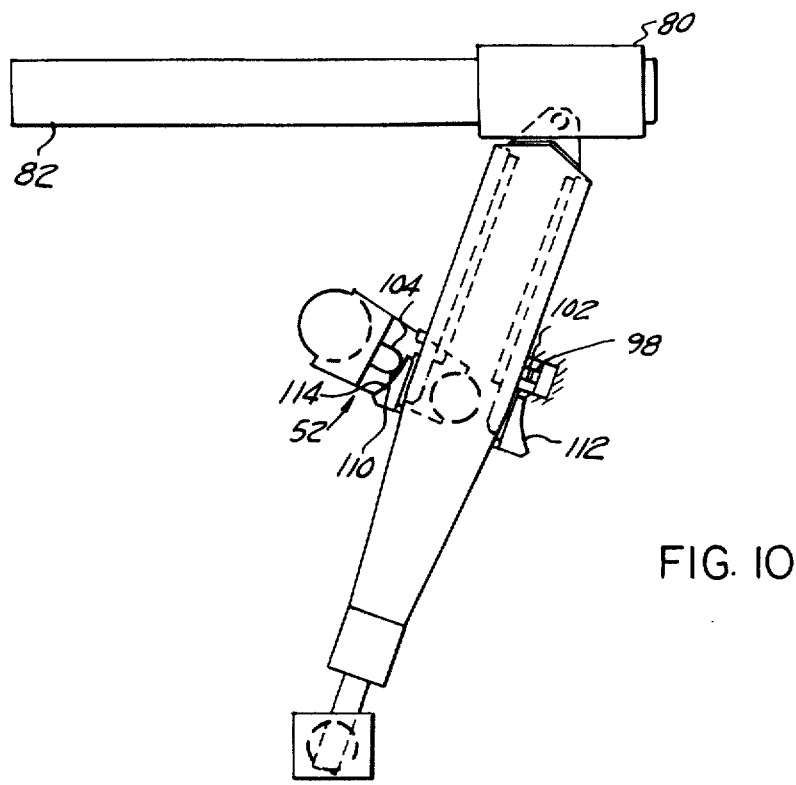

Past this point, the crank arm 52 serves to decelerate the transfer arm 78, with the mechanical advantage available to decelerate increasing as the mechanism approaches the position shown in FIG. 9.

As the transfer arm 78 moves into this position the roller bearing 72 leaves engagement with the rail surfaces 92 and 94 and at the same time the cam surfaces 110 and 114 move into engagement and the stops 98 and 102 move into registry.

Thus, despite continued rotation of the crank arm 52, the transfer arm 78 is stopped in a carefully controlled extreme position and is positively restrained in this position by the cam surfaces 110 and 114 and stops 98 and 102.

Continued rotation of the crank arm 52 results in tripping of limit switch 118, causing the motor 14 to be deenergized and magnetic brake 20 to be applied to arrest the rotation of the crank arm 52.

It will be appreciated that the final position of the crank arm 52 need not be precisely controlled since the position of the transfer arm 78 is not controlled thereby, and thus the drive motor 14 may be of the simple single speed type.

The transfer arm 78 is thus positioned relatively precisely so that the locator pins (not shown) may be reliably seated while the transfer arm 78 is in position with the dogs 122, 124 still in engagement with the protuberance 128 formed on the pallet 126. After the pallet 126 is so located the transfer bar is rotated to disengage the dogs 122 and 124 and the drive motor 14 is again energized, although reversed, to retract the transfer arm 78 in the same manner as it is advanced, back to the position shown in FIGS. 6 and 7, whereat the transfer bar is again rotated to bring the dogs back into engagement with pallets 126 before the locating pins are released.

That is, as the crank arm 52 retracts to the position shown in FIG. 7, the roller bearing 52 disengages with surfaces 92 and 94, while the cam surfaces 110 and 112 come into engagement.

Further rotation of crank arm 52 causes tripping of limit switch 116 to stop the motor 14 and apply the magnetic brake 20.

Thus, the precise positioning of the transfer arm 78 in the retracted position is also not dependent on the final angular position of the crank arm 52.

Accordingly, it can be seen that a simple, reliable, and accurate harmonic transfer drive mechanism has been provided which does not involve precision control of the motor drive, does not require hydraulic cylinders or other hydraulic equipment, and does not require expensive two speed motors or multispeed transmissions.

The foregoing detailed description has been in specific terms in common usage in order to make the description as understandable as possible.

However, the following terminology is used in the claims for the purpose of properly defining the invention under 35 USC 112 in broad terms commensurate with the scope of the invention. These terms correspond to the specific aforementioned terms as follows:

means supporting said transfer arm for oscillating movement: post 82, bushing 86 drive means oscillating the transfer arm: This includes the electric motor 14, the associated shafts and gearing, the crank arm 52, the roller bearing 72, rail surfaces 92, 94.

drive member: crank arm 52 said drive means also including means discontinuing said oscillation of said transfer arm after a predetermined movement of said drive member in said at least one direction by disengagement of said driving engagement of said cooperating cam surfaces formed on said transfer arm and said drive member upon further movement of said drive member in addition to said predetermined movement. This includes the configuring of the rail surfaces 92 and 94 relative the crank arm 52 and roller bearing 72 such that the roller bearing 72 passes out of engagement therewith after the transfer arm 78 has moved sufficiently in one or the other direction.

means restraining said transfer arm from oscillatory movement whenever said drive means discontinues said driving engagement between said cooperating cam surfaces formed on said transfer arm and said drive member after said predetermined movement of said drive member: This includes the cam stop means and stop means set forth below.

cooperating cam surfaces: rail surfaces 92, 94, roller bearing 72 cam stop means: cam elements 104, 106, 108 stop means: fixed stops 96, 98, and stop surfaces 100, 102

What is claimed is:

1. In a transfer machine of the type including a transfer bar engaging transferred objects with said transfer bar during advancing linear movement thereof, the improvement comprising:

a transfer bar drive mechanism comprising:

a transfer arm;

means drivingly connecting said transfer arm with said transfer bar;

means supporting said transfer arm for oscillating movement;

drive means oscillating said transfer arm including a drive member, and means oscillating said transfer arm in response to movement of said drive member including cooperating cam surfaces formed on said drive member and said transfer arm providing a driving engagement between said transfer arm and said drive member, said drive means also including means discontinuing said oscillation of said transfer arm after a predetermined movement of said drive member in said at least one direction by disengagement of said driving engagement of said cooperating cam surfaces formed on said transfer arm and said drive member upon further movement of said drive member in addition to said predetermined movement;

means restraining said transfer arm from oscillatory movement whenever said drive means discontinues said driving engagement between said cooperating cam surfaces formed on said transfer arm and said drive member after said predetermined movement of said drive member.

2. The mechanism of claim 1 wherein said drive means drive member comprises a rotary crank arm and wherein said means oscillating said transfer arm by said drive member includes means alternately rotating said crank arm in opposite directions.

3. The mechanism of claim 2 wherein said cooperating cam surfaces include a cam surface on said crank arm, said cooperating cam surfaces becoming disengaged upon continued rotation of said crank arm and corresponding oscillation of said transfer arm in at least one direction.

4. The mechanism of claim 1 wherein said means restraining said transfer arm from oscillatory movement includes cam stop means limiting oscillating movement of said transfer arm from said position whereat said discontinuing of said oscillation occurs.

5. The mechanism of claim 4 wherein said cam stop means limits said transfer arm oscillation in the reverse direction from said at least one direction.

6. The mechanism of claim 5 wherein said means restraining said transfer arm from oscillatory movement includes stop means limiting the continued oscillation of said transfer arm in said at least one direction past the point whereat said discontinuance of said driving engagement occurs.

7. The mechanism of claim 2 wherein said means restraining said transfer arm from oscillatory movement includes cam stop means limiting oscillating movement of said transfer arm from said position whereat said discontinuing of said oscillation occurs.

8. The mechanism of claim 7 wherein said cam stop means limits said transfer arm oscillation in the reverse direction from said at least one direction.

9. The mechanism of claim 6 further including cam stop means limiting oscillating movement of said transfer arm from said transfer arm position whereat said oscillation is discontinued, said cam stop means including cam stop surfaces formed on said transfer arm and said crank arm.

10. The mechanism of claim 9 wherein said cam stop surfaces includes a cam surface carried by said transfer arm and concentric to the axis of rotation of said crank arm when said transfer arm is in said position whereat oscillation is discontinued.

11. The mechanism of claim 10 wherein said cam stop means limits said transfer arm oscillation in the reverse direction from said at least one direction.

12. The mechanism of claim 11 wherein said means restraining said transfer arm from oscillatory movement includes stop means limiting the continued oscillation of said transfer arm in said at least one direction past the point whereat said discontinuance of said driving engagement of said cooperating cam surfaces occurs.

13. The mechanism of claim 2 wherein said means restraining said transfer arm from oscillatory movement includes cam stop means having a pair of cam surfaces carried by said transfer arm one of said pair of surfaces concentric to the axis of rotation of said crank arm when said transfer arm is in each of said positions whereat oscillation is discontinued.

14. The mechanism of claim 1 wherein said cooperating cam surfaces include rail surfaces formed on said transfer arm and a roller bearing carried by said drive member engaged therewith.

* * * * *